United States Patent
Mai et al.

[11] 3,900,428
[45] *Aug. 19, 1975

[54] CATALYST FOR THE REDUCTION OF NITRIC OXIDES

[75] Inventors: Gerhard Mai, Bruchkobel; Reiner Siepmann, Rodenbach; Franz Kummer, Rossdorf, all of Germany

[73] Assignee: W. C. Heraeus GmbH, Hanau, Germany

[ * ] Notice: The portion of the term of this patent subsequent to Aug. 26, 1992, has been disclaimed.

[22] Filed: Sept. 7, 1973

[21] Appl. No.: 395,090

Related U.S. Application Data

[63] Continuation-in-part of Ser. No. 295,790, Oct. 6, 1972, abandoned, which is a continuation-in-part of Ser. No. 284,323, Aug. 28, 1972, abandoned.

[30] Foreign Application Priority Data

Oct. 19, 1971 Germany............................ 2151958

[52] U.S. Cl. ................ 252/462; 252/470; 252/471; 252/472; 423/213.2; 423/213.5
[51] Int. Cl.² ........................................ B01J 23/10
[58] Field of Search .......... 252/461, 462, 470, 471, 252/472; 423/213.2, 213.5

[56] References Cited
UNITED STATES PATENTS

| | | | |
|---|---|---|---|
| 3,331,787 | 7/1967 | Keith et al. | 252/477 R |
| 3,595,809 | 7/1971 | Kehl | 252/462 |
| 3,644,147 | 2/1972 | Young | 136/86 D |
| 3,780,126 | 12/1973 | Manning | 252/471 X |

*Primary Examiner*—W. J. Shine
*Attorney, Agent, or Firm*—Burgess, Dinklage & Sprung

[57] ABSTRACT

Nitric oxides such as present in automobile exhaust gases are reduced by a catalyst having the formula $$(A_1)_m(A_2)_n(B_1)_p(B_2)_q O_3$$

wherein
$m$ and $n$, respectively, have values of 0 to 1, and
$p$ and $q$, respectively, have values greater than 0 but less than 1, and $m + n = 1$ and $p + q = 1$, and
$A_1$ is at least one trivalent cation of metals selected from the group of Bi and the rare earth metals;
$A_2$ is at least one divalent cation of metals selected from the group of Sr, Ba and Pb;
$B_1$ is at least one divalent cation of metals selected from the group of Ni, Co, Fe, Zn, Cu, and Mn;
$B_2$ is at least one selected from the group of at least one tetravalent cation of metals from the group of Ru, Os, Ir, Pt, Ti, Mo, W, Nb, and Mn and V, and at least one pentavelent cation of metals from the group of Ta, Sb and Nb;

provided that $(m \cdot a_1) + (n \cdot a_2) + (p \cdot b_1) + (q \cdot b_2) = 6$ such that a neutrality of charge is established, wherein
$a_1$ = valency of $A_1$;
$a_2$ = valency of $A_2$;
$b_1$ = valency of $B_1$; and
$b_2$ = valency of $B_2$.

8 Claims, 1 Drawing Figure

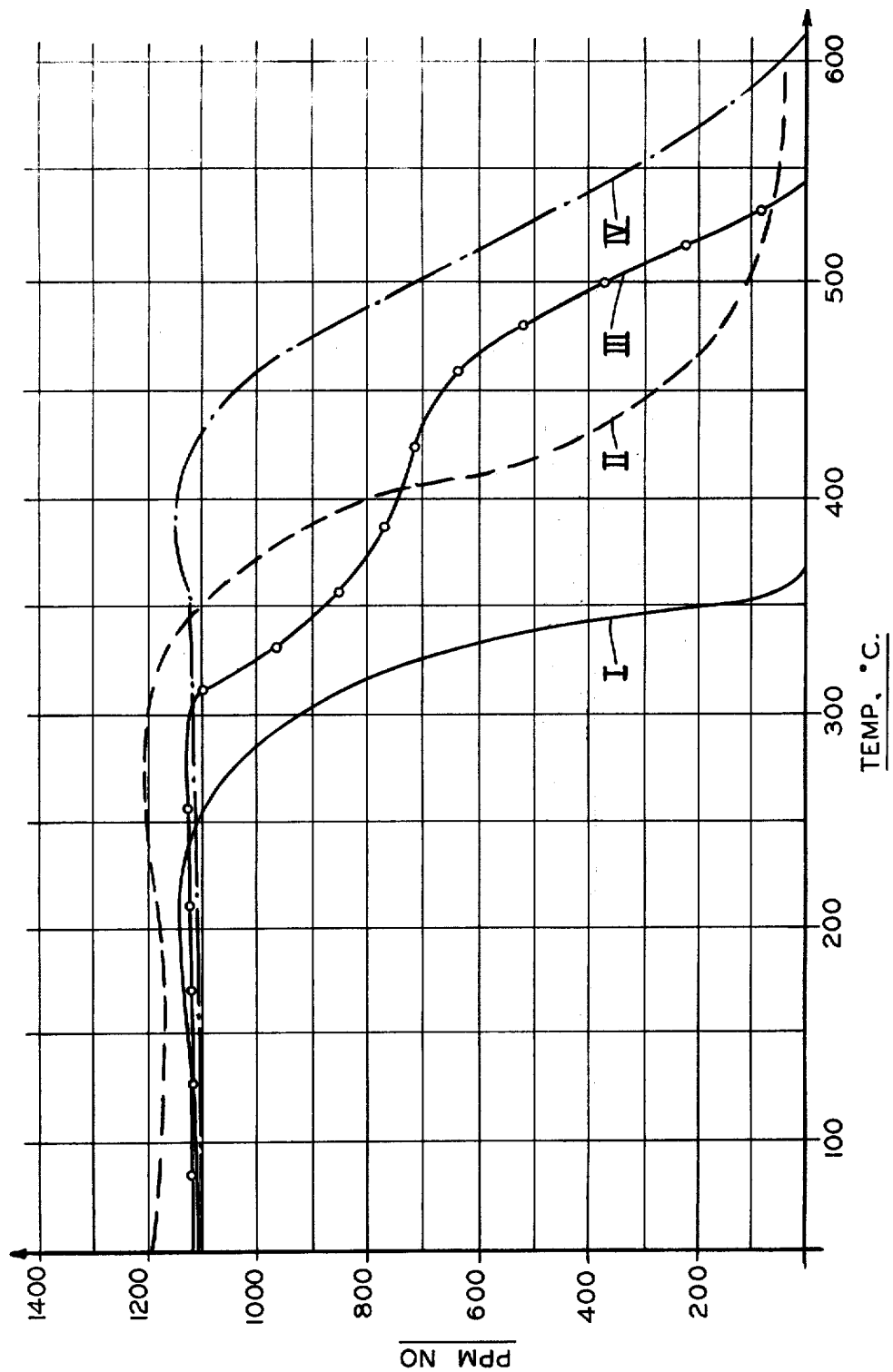

CATALYST FOR THE REDUCTION OF NITRIC OXIDES

RELATED APPLICATION

This application is a continuation-in-part of copending application Ser. No. 295,790 filed Oct. 6, 1972 now abandoned, which in turn is a continuation-in-part of application Ser. No. 284,323 filed Aug. 28, 1972, now abandoned, and is related to copending application Ser. No. 395,089, filed Sept. 7, 1973 which is a continuation-in-part of application Ser. No. 294,705 filed Oct. 3, 1972, now abandoned.

BACKGROUND

This invention relates to a catalyst for the reduction of nitric oxides, especially in automotive exhaust gases.

Exhaust gases containing nitric oxides are produced, for example, in the production of nitric acid and in the combustion of fuels in automobile motors.

It is known that nitric oxides have corrosive effects and harmful effects on plants and animals. Their photochemical reaction with hydrocarbons, such as those from automobile exhaust gases, leads to the formation of smog and hence to the formation of irritants.

Efforts have long been made to remove the nitric oxides from the exhaust gases.

A process suitable for the purpose is the catalytic treatment of exhaust gases containing nitric oxides in the presence of a reducing agent such as carbon monoxide or of a combustible gaseous hydrocarbon, the nitric oxides being thus transformed to harmless reaction products.

Many catalysts known for this purpose contain metals of the platinum group. For example, in German Patent No. 1,088,938, catalysts containing palladium and/or rhodium, plus in some cases another metal of the platinum group, are used for the reduction of nitric oxides in the presence of a gaseous fuel containing hydrocarbons.

DOS 2,026,318 describes a catalyst for the reduction of nitric oxides in automobile exhausts, which contains a mixture of iron oxide with cobalt oxide and/or nickel oxide. Neodymium oxide and/or praseodymium oxide may also be added to this compostion.

SUMMARY

It is the object of the invention to provide a catalyst for the reduction of nitric oxides, especially in automobile exhausts, which is highly active and which will as selectively as possible cause nitrogen to form as the reduction product of the nitric oxides, i.e., which will suppress the formation of ammonia. Furthermore, the catalyst is to have the longest possible life along with constant good activity.

This object is achieved in accordance with the invention by a catalyst composition of the general formula $$(A_1)_m(A_2)_n(B_1)_p(B_2)_qO_3$$

wherein $m$ and $n$, respectively, have values of 0 to 1, and $p$ and $q$, respectively, have values greater than 0 but less than 1, and $m + n = 1$ and $p + q = 1$, and $A_1$ is at least one trivalent cation of metals selected from the group of Bi and the rare earth metals;

$A_2$ is at least one divalent cation of metals selected from the group of Sr, Ba and Pb;

$B_1$ is at least one divalent cation of metals selected from the group of Ni, Co, Fe, Zn, Cu, and Mn;

$B_2$ is at least one selected from the group of at least one tetravalent cation of metals from the group of Ru, Os, Ir, Pt, Ti, No, W, Nb, and Mn and Mo, and at least one pentavalent cation of metals from the group of Ta, Sb and Nb; provided that $(m.a_1) + (n.a_2) + (p.b_1) + (q.b_2) = 6$ such that a neutrality of charge is established, wherein $a_1$ = valency of $A_1$;
$a_2$ = valency of $A_2$;
$b_1$ = valency of $B_1$; and
$b_2$ = valency of $B_2$.

DESCRIPTION OF THE DRAWING

The accompanying drawing is a graph illustrating the effectiveness of the catalyst of the invention in reference to the example herein.

DESCRIPTION

These catalysts may be used as solid catalysts (bodies formed of catalytic material or of catalytic material, uniformly mixed with a binding agent such as ceramic cement), or else in conjuction with a support, preferably made of a glass ceramic (cf. U.S. Pat. Nos. 2,998,675 and 3,275,493) or ceramic substance, such as $\alpha$-$Al_2O_3$, on whose surface the catalytic material is applied. The shape of the support material may be as desired, but preferably the support material is in honeycomb tube or pellet form.

The catalysts of the invention have proven to be substantially more active than the catalysts known hitherto for this purpose.

Quite surprisingly it has been found that the catalysts containing metals of the platinum group in accordance with the invention, in contract to the known catalysts containing the platinum group metals in metallic form, are virtually insensitive to lead. Their activity is sustained also for a long period of time.

Virtually the same high catalytic activity is displayed by catalysts in accordance with the invention which contain one or more of the above-named base metal components instead of the noble metal component or components. They, too, are virtually insensitive to lead.

The use of the catalyst of the invention for the removal of nitric oxides from automobile exhausts has proven especially advantageous inasmuch as virtually no ammonia is produced in their reduction in the presence of this catalyst.

Very good results have been achieved with a catalyst of the following composition: 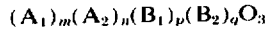 which is prepared according to Example 1 herein. On the basis of x-ray studies, this compound has a perovskite structure.

In many oxides of the formula $ABO_3$, wherein A signifies metal ions and B metal ions different from A, the perovskite structure occurs (cf. U.S. Pat. No. 3,595,809). The cations A and B are of different size. One of the cations is much smaller than the others. The cation A does not have to be a cation of only one metal, but can be composed of cations of various metals ($A_1 + A_3 + \ldots + A_n$), whereby all of these cations must have approximately the same ion radius. The same applies to the B cation. For example, an oxide with perovskite structure can have the formula.

$(A_1 + A_2)(B_1 + B_2 + B_3)O_3$.

The charges of the cations can vary but the total charge must amount to + 6.

In tests of catalytic activity, there was observed a relationship between the structural characteristics of these "mixed oxides" and their catalytic activity. Especially catalytically active are mixed oxides having a perovskite structure.

Generally, these mixed oxides are prepared by reacting suitable starting compounds in stoichiometric amounts necessary to the emperical formula $(A_1)_m(A_2)_n(B_1)_p(B_2)_q O_3$ Thus, aqueous solutions, containing the cations $A_1$, $A_2$, $B_1$ and $B_2$ in the form of their nitrates, were evaporated to dryness and the obtained residue was heated to incandescence at 700°C for 4 hours.

From a number of mixed oxides produced, X-ray powder diagrams were made for determining their structure. The obtained diagrams clearly show the reflexes of a perovskite phase. It was not possible to detect oxides of the individual elements roentgenographically. It was concluded from this that the cations present in the starting compounds used had reacted with one another by forming a composition with perovskite structure, which could therefore be assigned an empirical formula, for example $LaCo_{1/6}Fe_{1/6}Ni_{1/6}Ru_{1/2}O_3$.

Catalysts prepared in the Examples were tested roentgenographically. Taking the numerous self-interferences of the cordierite carrier used in the examples herein into consideration, it was possible to identify the strongest reflexes of the perovskite phase which do not coincide with the reflexes of the carrier material. The band separations $d$ [A] for the catalytically active composition of the carrier catalysts described in the examples 1 and 2 were as follows:

| Catalytically active composition: | Band separations d [A]: | | | |
|---|---|---|---|---|
| 1. $LaFe_{1/6}Co_{1/6}Ni_{1/6}Ru_{1/2}O_3$ | 2.79 | 2.28 | 1.96₀ | 1.60₀ |
| 2. $LaFe_{1/6}Ni_{1/6}Co_{1/6}Ru_{1/6}Ti_{1/2}O_3$ | 2.78 | 2.27 | 1.96₃ | 1.60₃ |

In the following Example 1 the manufacture of a catalyst mounted on a honeycomb tube is described.

EXAMPLE 1

4.45 g La, 0.3135 g Ni, 0.3149 g Co. 0.2985 g Fe and 1.619 g Ru, each in the form of nitrates, are dissolved in 600 ml of water. A honeycomb tube volume of 2 liters is impregnated with the solution. After drying at 120°C, the impregnated honeycomb tube is subjected to a heat treatment at 600°C in air. The honeycomb tube thus obtained contains 0.1% ruthenium with respect to its total weight.

The effectiveness of this catalyst is visually represented by Curve I (solid line) in the annexed drawing. It represents the diminution of the NO content (given in ppm) of a test gas which in its content of NO, CO, $H_2$, $H_2O$, $O_2$ and $N_2$ corresponds to the exhaust gas of an Otto-cycle engine, when it is passed through the catalyst, in relation to the temperature (given in °C). Curve I shows that the NO reduction begins at 250°C and the NO is virtually completely reduced at a temperature as low as 350°C.

To study the effect of lead on the activity of this catalyst it was treated with lead acetate solution and heated first to 100°C and then to 500°C. The amount of lead absorbed corresponded to the amount of lead that is produced in the operation of a motor vehicle using leaded gasoline over a distance of 20,000 kilometers.

The effectiveness of this lead-containing catalyst was tested under the same experimental conditions as in the testing of the lead-free catalyst. Curve II (broken line) in the appended drawing shows the diminution of the NO content of the test gas in the presence of this lead-containing catalyst. It, too, completely reduces NO without the formation of appreciable amounts of ammonia. Its working temperature ranges from 350° to 550°C.

Very good results were also achieved with a catalyst of the composition $LaFe_{1/6}Ni_{1/6}Co_{1/6}Ru_{1/6}Ti_{1/3}O_3$.

In the following Example 2, the manufacture of this catalyst, supported on a honeycomb tube, is described.

EXAMPLE 2

4.45 g La, 0.3135 g Ni, 0.3149 g Co, 0.2985 g Fe, 0.539 g Ru, in each case used in form of the nitrate, and 0.511 g Ti, used as Ti (III) in form of $TiCl_3$, are dissolved in 600 ml water. By the addition of $H_2O_2$ Ji (III) is oxidized to Ti (IV). With the obtained solution, a honeycomb tube volume of 2 liters is impregnated. After drying at 120°C, the impregnated honeycomb tube is subjected to a heat treatment at 600°C.

The effectiveness is represented by Curve III (line composed of dashes alternating with circles) in the appended drawing. The temperature range in which the reduction of the NO was achieved with this catalyst, is between about 300° and 550°C.

Good catalytic activity is displayed by the composition $LaFe_{1/6}Ni_{1/6}Co_{1/6}V_{1/2}O_3$. The production of this catalyst, supported on a honeycomb tube, is performed in the manner described as follows:

EXAMPLE 3

4.45 g La, 0.3135 g Ni, 0.3149 g Co, 0.2985 g Fe and 0.815 g V, in each case used in the form of the nitrates, are dissolved in 600 ml water. A honeycomb tube volume of 2 liters is impregnated with the obtained solution. After drying at 120°C, the impregnated honeycomb tube is subjected to a heat treatment at 600°C in air.

Its effectiveness is shown by Curve IV (dash-dotted line) in the appended drawing. The temperature range within which the reduction of NO is accomplished with this catalyst extends from 450° to 580°C.

EXAMPLE 4

The composition $LaFe_{1/6}Ni_{1/6}Co_{1/6}Ti_{1/2}O_3$ has also been found to have good catalytic activity. The preparation of this catalyst, supported on a honeycomb tube, is performed as follows:

4.45 g La, 0.3135 g Ni, 0.3149 g Co, 0.2985 g Fe, each used in the form of the nitrates, and 0.766 g Ti, used as Ti (III) in form of $TiCl_3$, are dissolved in 600 ml of water. By addition of H₂O₂, Ti (III) is oxidized to Ti(IV). A honeycomb tube volume of 2 liters is impregnated with the obtained solution. After drying at 120°C, the impregnated honeycomb tube is subjected to a heat rreatment at 600°C in air. In the following examples the manufacture of some solid catalysts is described.

EXAMPLE 5

Following the general procedures of Example 1 a catalyst having the formula $Bi_{1/3}Ba_{2/3}Mn_{1/6}Nb_{5/6}O_3$ can be prepared from 9,70 g of $Bi(NO_3)_3.5H_2O$, 6,90g of $Ba(CO_3)_2$ and 1,15g of $Mn(CO_3)_2$ dissolved in a solution of 10 ml of concentrated nitric acid in 90 ml of water. The obtained solution is mixed with a solution of 6,65 g of $Nb_2O_5$ in 100 ml of an aqueous solution containing 10% of weight of tartaric acid. This mixture was then evaporated to dryness at 150°C and the obtained residue was heated in air at 600°C for 4 hours to provide a catalyst of the aforementioned formula.

EXAMPLE 6

Following the general procedures of Example 1 a catalyst having the formula $Bi_{1/2}Ba_{1/2}MnO_3$ can be prepared from 13,98 g of $Bi_2O_3$, 5,921 g of $Ba(CO_3)_2$ and 6,90 g of $Mn(CO_3)_2$ suspended in 100 ml of water and dissolved by adding concentrated nitric acid. The solution was then evaporated to dryness at 150°C and the obtained residue was heated in air at 600°C for 4 hours to provide a catalyst of the afore mentioned formula.

EXAMPLE 7

Following the general procedures of Example 1 a catalyst having the formula $Bi_{3/4}Ba_{3/4}Mn_{5/12}Nb_{7/12}O_3$ can be prepared from 7,27 g of $Bi(NO_3)_3 \cdot 5 H_2O$, 8,88 g of $Ba(CO_3)_2$ and 2,87 g of $Mn(CO_3)_2$ dissolved in a solution of 10 ml of concentrated nitric acid in 90 ml of water. The obtained solution is mixed with a solution of 4,65 g of $Nb_2O_5$ in 100 ml of an aqueous solution containing 10% of weight of tartaric acid. This mixture was then evaporated to dryness at 150°C and the obtained residue was heated in air at 600°C for 4 hours to provide a catalyst of the afore mentioned formula.

EXAMPLE 8

Following the general procedures of Example 1 a catalyst having the formula $Nd_{1/3}Ba_{2/3}Mn_{1/6}Nb_{5/6}O_3$ can be prepared from 3,36 g of $Nd_2O_3$, 6,90 g of $Ba(CO_3)_2$ and 1,15 g of $Mn(CO_3)_2$, dissolved in a solution of 10 ml of concentrated nitric acid in 90 ml of water. The obtained solution is mixed with a solution of 6,65 g of $Nb_2O_5$ in 100 ml of an aqueous solution containing 10% of weight of tartaric acid. This mixture was then evaporated to dryness at 150°C and the obtained residue was heated in air at 600°C for 4 hours to provide a catalyst of the afore mentioned formula.

EXAMPLE 9

Following the general procedures of Example 1 a catalyst having the formula $Nd_{1/2}Ba_{1/2}MnO_3$ can be prepared from 5,14 g of $Nd_2O_3$, 5,921 g of $Ba(CO_3)_2$ and 6,90 g of $Mn(CO_3)_2$ suspended in 100 ml of water and dissolved by adding concentrated nitric acid. The solution was then evaporated to dryness at 150°C and the obtained residue was heated in air at 600°C for 4 hours to provide a catalyst of the afore mentioned formula.

EXAMPLE 10

Following the general procedures of Example 1 a catalyst having the formula $Nd_{1/4}Ba_{3/4}Mn_{5/12}Nb_{7/12}O_3$ can be prepared from 2,52 g of $Nd_2O_3$, 8,88 g of $Ba(CO_3)_2$ and 2,87 g of $Mn(CO_3)_2$, dissolved in a solution of 10 ml of concentrated nitric acid in 90 ml of water. The obtained solution is mixed with a solution of 4,65 g of $Nb_2O_5$ in 100 ml of an aqueous solution containing 10% of weight of tartaric acid. This mixture was then evaporated to dryness at 150°C and the obtained residue was heated in air at 600°C for 4 hours to provide a catalyst of the afore mentioned formula.

EXAMPLE 11

A catalyst having the formula $Nd_{5/6}Ba_{1/6}Co_{5/12}V_{7/12}O_3$ can be prepared by admixing a solution of 16,52 g of $Nd(NO_3)_3$, 2,61 g of $Ba(NO_3)_2$ and 7,28 g of $Co(NO_3)_2 \cdot 6 H_2O$ in 50 ml of water with a solution of 6,36 g of $V_2O_5$ in 50 ml of a dilute solution of ammonium hydroxide thereby providing a precipitate, suspended in the solution medium. The slurry was then evaporated to dryness at 150°C and the obtained residue was heated in air at 600°C for 4 hours to provide a catalyst of the afore mentioned formula.

What is claimed is:

1. Catalyst having the formula:

$$(A_1)_m (B_1)_p (B_2)_q O_3$$

wherein $m$ is 1, and $p$ and $q$, respectively, have values greater than 0 but less than 1, and $p + q = 1$; and $A_1$ is at least one trivalent cation of metals selected from the group consisting of Bi and the rare earth metals;

$B_1$ is at least one divalent cation of metals selected from the group consisting of Ni, Co, Fe and Cu;

$B_2$ is at least one tetravalent cation of metals selected from the group consisting of Ru, Os, Ir, Pt, Ti, Mo, Mn and V; with the proviso that when $B_1$ is Cu, $B_2$ is only Mn, and the further proviso that $(m \cdot a_1) + (p \cdot b_1) + (q \cdot b_2)$ equals 6 such that a neutrality of charge exists, wherein $a_1 =$ the valency of $A_1$ $b_1 =$ the valency of $B_1$ and $b_2 =$ the valency of $B_2$.

2. Catalyst of claim 1 having the formula $LaCo_{1/6}Fe_{1/6}Ni_{1/6}Ru_{1/2}O_3$.

3. Catalyst of claim 1 having the formula $LaFe_{1/6}Ni_{1/6}Co_{1/6}Ru_{1/6}Ti_{1/3}O_3$.

4. Catalyst of claim 1 having the formula $LaFe_{1/6}Ni_{1/6}Co_{1/6}V_{1/2}O_3$.

5. Catalyst of claim 1 having the formula $LaFe_{1/6}Ni_{1/6}Co_{1/6}Ti_{1/2}O_3$.

6. Catalyst of claim 1 applied to a support.

7. Catalyst of claim 6 wherein the support has a honeycomb structure.

8. Catalyst of claim 1 uniformly mixed with a ceramic binding agent.

* * * * *

UNITED STATES PATENT OFFICE
CERTIFICATE OF CORRECTION

Patent No. 3,900,428　　　　　　　　　Dated August 19, 1975

Inventor(s) Gerhard Mai et al

It is certified that error appears in the above-identified patent and that said Letters Patent are hereby corrected as shown below:

Column 2, line 5, "no" should read --Mo--.

Column 2, line 5, "Mo" should read --V--.

Column 4, line 26, "Ji" should read --Ti--.

Column 5, line 5, "rreatment" should read --treatment--.

Signed and Sealed this sixth Day of January 1976

[SEAL]

Attest:

RUTH C. MASON　　　　　　　　　C. MARSHALL DANN
Attesting Officer　　　　　　Commissioner of Patents and Trademarks